(12) United States Patent
Blecha et al.

(10) Patent No.: US 11,971,069 B2
(45) Date of Patent: Apr. 30, 2024

(54) LARGE ANGLE FLEXIBLE PIVOT

(71) Applicant: ALMATECH SA, Lausanne (CH)

(72) Inventors: Luc Blecha, Lausanne (CH); Martin Humphries, Bristol (GB); Yoel Puyol, Renens (CH)

(73) Assignee: ALMATECH SA, Lausanne (CH)

( * ) Notice: Subject to any disclaimer, the term of this patent is extended or adjusted under 35 U.S.C. 154(b) by 1763 days.

(21) Appl. No.: 15/773,820

(22) PCT Filed: Nov. 3, 2016

(86) PCT No.: PCT/IB2016/056604
§ 371 (c)(1),
(2) Date: May 4, 2018

(87) PCT Pub. No.: WO2017/077469
PCT Pub. Date: May 11, 2017

(65) Prior Publication Data
US 2018/0319517 A1    Nov. 8, 2018

(30) Foreign Application Priority Data

Nov. 6, 2015    (EP) ..................................... 15193517

(51) Int. Cl.
*F16C 11/12*    (2006.01)
(52) U.S. Cl.
CPC .......... *F16C 11/12* (2013.01); *F16C 2326/47* (2013.01); *Y10T 403/45* (2015.01)
(58) Field of Classification Search
CPC .... F16C 11/12; F16C 2326/47; Y10T 403/45; Y10T 403/451; Y10T 403/452; Y10T 403/54
See application file for complete search history.

(56) References Cited

U.S. PATENT DOCUMENTS

| 2,907,563 | A |   | 10/1959 | Verde et al. |
| 3,575,475 | A | * | 4/1971 | Boerner .................. F16D 3/005 403/291 |

(Continued)

FOREIGN PATENT DOCUMENTS

| DE | 3241373 A1 * | 5/1984 |
| EP | 0 974 761 A1 | 1/2000 |

(Continued)

OTHER PUBLICATIONS

International Search Report, dated Mar. 7, 2017, from corresponding PCT/IB2016/056604 application.

*Primary Examiner* — Michael P Ferguson
*Assistant Examiner* — Kevin J Baynes
(74) *Attorney, Agent, or Firm* — NIXON & VANDERHYE

(57) ABSTRACT

A flexible pivot includes a first stage including a first cylinder and interface structure and a second stage including a second cylinder and interface structure in axial alignment with those of the first stage. Flexible connecting members are arranged for connecting the first and the second stages. Each flexible connecting member includes a pair of legs and a cross member joining the legs, each leg extending in a direction transverse to the axis of the cylinders, the legs being attached to the first and the second cylinders respectively. The first cylinder and the first interface structure are concentric. Flexible spokes are attached to the first cylinder by one end and to the first interface structure by the other. Each spoke extends in a direction transverse to the axis of the cylinders. Finally, the second stage includes flexible connection unit arranged to connect the second cylinder to the second interface structure.

17 Claims, 6 Drawing Sheets

(56) References Cited

U.S. PATENT DOCUMENTS

| | | | | |
|---|---|---|---|---|
| 4,499,779 | A | * | 2/1985 | Maass ................... B06B 1/166 74/61 |
| 6,267,363 | B1 | * | 7/2001 | Genequand ............ F16C 11/12 267/161 |
| 8,899,869 | B2 | * | 12/2014 | Valois ................... F16C 11/12 403/291 |
| 9,079,672 | B2 | * | 7/2015 | Baudasse ............... B64G 1/222 |
| 9,400,378 | B2 | * | 7/2016 | Xu ........................ G02B 21/32 |
| 9,759,263 | B1 | * | 9/2017 | Salas .................... F16C 19/527 |
| 2008/0205976 | A1 | | 8/2008 | Jeandot et al. |
| 2009/0173170 | A1 | * | 7/2009 | Mastinu ................. G01L 3/22 403/113 |
| 2010/0296862 | A1 | | 11/2010 | Baudasse |

FOREIGN PATENT DOCUMENTS

| EP | 1 964 778 A1 | 9/2008 |
|---|---|---|
| EP | 2 256 039 A1 | 12/2010 |

\* cited by examiner

LARGE ANGLE FLEXIBLE PIVOT

FIELD OF THE INVENTION

The present invention relates generally to a flexible pivot comprising a first stage comprising a first interface structure and a second stage comprising a second interface structure in axial alignment with the first interface structure, the flexible pivot being arranged to be fixed to a base by one of the interface structures and to carry a load attached to the other interface, the flexible pivot comprising a first cylinder forming part of the first stage, a second cylinder in axial alignment with the first cylinder and forming part of the second stage, and a set of flexible connecting members for connecting the first and the second stages, each flexible connecting member comprising a pair of legs and a cross member joining the legs, each leg extending in a direction transverse to the axis of the cylinders, and the legs being attached to the first and the second cylinders respectively.

BACKGROUND OF THE INVENTION

Many space applications require actively controlling the orientation of certain devices on a satellite or a spacecraft. One example is controlling the orientation of an antenna in such a way that it remains pointed in the direction of a fixed location on the surface of the Earth. Another example is controlling the orientation of a mirror used to scan the surface of a celestial body. Such orientation control requires cyclic fine-pointing. Furthermore, this involves a very large number of cycles over the scanning range, on orbit. Space mechanisms are also subjected to micro-vibration generated by the surrounding equipment. They therefore require supports that decouple the optical system from the external micro-perturbations in order to maximize the optical performance.

A satellite is placed in orbit only once, and it then normally stays unattended for its entire lifetime. In order to ensure their ability to withstand this repeated stress, pivot mountings for space applications have to be made extremely robust and hard-wearing. For example, some pivot mountings have to be capable of withstanding up to 600,000,000 cycles. Other common requirements for pivot mountings are a great mechanical strength (to withstand both external forces and bending moments exerted on the mounted shaft), high transverse stiffness, high-precision zero-tolerance guidance, an amplitude of rotation of several tenths of degrees in both directions, and, a low resistive torque.

Conventional bearings that use sliding or rolling elements (e.g. ball bearings) need effective lubrication and generate wear particles. The generation of wear particles is a problem for mechanisms in general and for optical applications in particular. Indeed, wear particles can jam the mechanism and also migrate to optical components, thus directly affecting the optical performance of instruments. While there are options for both wet and dry lubrication (specially developed oils and greases), these solutions have important drawbacks that are becoming more and more of an issue as both the lifetime and on-Earth storage time, increase. For example, many missions nowadays require an on-orbit life over three times as long as the on-orbit life required two decades ago. The same is true for storage life. Another drawback of conventional bearings is the noise they generate which drastically reduces the fine-pointing performance of any optical system. Still another problem is the thermo-elastic dependency of the behavior shown by ball bearings.

Flexible pivots are therefore most often the preferred choice in the context of long life, clean and precise applications in space.

Flexible pivots are known. One such pivot is illustrated in FIGS. 8 and 9 of published patent document EP 2 256 039. FIG. 1 of the present application is a duplicate copy of the above-mentioned FIG. 8. The illustrated prior art flexible pivot meets the definition given in the introductory "field of the invention" paragraph of the present application. Indeed, as can be observed in FIG. 1, the pivot comprises a first central cylinder 1 forming part of a first stage and two second cylinders 2a, 2b in axial alignment with the central cylinder and forming part of a second stage. The second cylinders are arranged symmetrically on each side of the first cylinder 1. The first or central cylinder 1 is arranged to serve as a first interface structure that may for example carry a load, while the two cylinders 2a, 2b are arranged to serve jointly as a second interface structure that may be connected to a fixed base that has not been depicted. The first and the second stages are connected by three flexible connecting members causing the pivot to exhibit 3-fold rotational symmetry. Each flexible connecting member comprises a pair of legs 7, 8a, 8b and a cross member (3a, 3b and 3c respectively) joining the legs, each leg extending in a direction transverse to the axis of the cylinders, and the legs being attached to the first 1 and the second 2a, 2b cylinders respectively.

Although the above-described prior art flexible pivot provides twice the angular capacity of a flexible pivot having just a single stage, there is a need in the art for flexible pivots having an even larger rotational range. In order to address this need, the above-mentioned prior art patent document proposes to make pivots with more than two stages. In this regard, FIG. 2 of the present application is a duplicate copy of FIG. 10b of said prior art document. This figure shows a cross-section of a prior art flexible pivot comprising four stages. In principle, this second prior art flexible pivot should provide twice the rotational range of the pivot shown in FIG. 1. As can be observed in FIG. 2, the flexible pivot comprises a first central cylinder 1 forming part of a first stage and two second cylinders 2a, 2b in axial alignment with the central cylinder and forming part of a fourth stage. The second cylinders are arranged symmetrically on each side of the first cylinder 1, and two additional cylinders 4a, 4b are further intercalated between the central cylinder and the second cylinders on either side. The additional cylinders 4a and 4b bridge the second and the third stages and they each are part of both of these stages. Each stage is connected to the following stage by flexible connecting members similar to the ones depicted in FIG. 1. Each flexible connecting member comprises a pair of legs and a cross member joining the legs. As can be observed in FIG. 2, the flexible connecting member joining the first and the second stage comprises the cross member 3 arranged to join legs 7, 8a and 8b. There are two flexible connecting members for joining the second and the third stage. These particular flexible connecting members comprise, on the one hand, cylinder 4a joining legs 8a and 9a, and on the other hand, cylinder 4b joining legs 8b and 9b. There are further two flexible connecting members for joining the third and the fourth stage. These particular flexible connecting members comprise, on the one hand, cross member 5 joining legs 9a and 11a, and on the other hand, cross member 6 joining legs 9b and 11b.

As previously explained, the prior art flexible pivot that has just been described should in principle provide twice the rotational range of the prior art pivot shown in FIG. 1. The prior art device that has just been described has certain drawbacks. In particular, it can be observed that the four-stage pivot is also twice as long in the axial direction as the two-stage flexible pivot of FIG. 1. The person skilled in the art will have no trouble understanding that increasing the length of the pivot in the axial direction may well be detrimental as far as axial stiffness is concerned. Finally, the stages in a multistage flexible pivot like the one depicted in FIG. 2, are separated by gaps and have low radial stiffness when actuated. In case of radial loading, the effect known as "center shift" can happen due to the low radial stiffness at each stage. Therefore, in presence of a radially oriented force, a larger number of stages should in principle also imply a larger total center shift, which is not desirable. In other words, with the flexible pivot disclosed in the above-described prior-art patent document, the price to pay for increasing the rotational range of motion is to lower the radial and axial stiffness. In other words, a covariation is observed between the rotational, radial and axial stiffness of prior-art flexible pivots. The person skilled in the art will understand that this covariation is at the root of a number of potential problems. In particular, increasing the rotational range can end up making it difficult to decouple the vibration modes of the flexible pivot from those of other components of the satellite or spacecraft.

SUMMARY OF THE INVENTION

It is therefore an object of the present invention to solve the above-mentioned problems of prior art multistage flexible pivots by providing a flexible pivot according to the annexed claim 1.

A "direction transverse to an axis" should be understood as meaning a direction in a plane that is perpendicular to the axis in question.

According to the invention, the first and the second cylinders are connected via flexible connection means to the first and the second interface structures respectively. Therefore, the flexible connection means arranged between each of the two cylinders and the corresponding interface structure contributes to the angular capacity of the flexible pivot. Furthermore, the first cylinder and the first interface structure are concentric and the flexible connection means connecting them together is implemented in the form of a set of spokes that are intercalated between the flexible connecting members. The spokes are arranged substantially in the same plane as the flexible legs of the connecting members that are attached to the first cylinder. A first advantage of the invention is therefore that the presence of the spokes brings about an increase of the rotational range of the flexible pivot without increasing the length of the pivot in the axial direction.

A second advantage of the invention is that it makes it possible to determine independently the radial, axial, and rotational stiffness of the flexible pivot during the design phase. A third advantage of the invention is that the presence of the spokes and of the flexible connection means allows one to improve the centering of the axis, and thus to reduce the center shift drastically.

According to various particular embodiments of the invention, at least the first stage of the flexible pivot preferably comprises flexible attachment means for attaching the outer end of each of the flexible spokes in the set to either the first interface structure or the first cylinder (whichever one of the two surrounds the other one). One advantage of having flexible attachment means, is that it allows the effective length of the spokes to vary substantially. The flexible attachment means is preferably implemented in the form of thin strips forming the outer end of each spoke. Each thin strip is oriented at an angle relative to the rest of the spoke, and at least a distal end of the thin strip is integrally connected to either the first interface structure or the first cylinder. One will understand that the presence of the flexible attachment means allows the flexible pivot to accommodate to any change in the curvature of the spokes. Furthermore, the use of flexible attachment means, also allows for custom tuning of the radial stiffness independently from the other degrees of freedom which permits to decouple the axis of the pivot from the external microvibrations on orbit. Another application of this tunable radial stiffness is to limit the travel under certain loading in order to keep an encoder head in the reading range for example or to define the clearance and its closing force for a launch lock system.

BRIEF DESCRIPTION OF THE DRAWINGS

Other features and advantages of the present invention will appear upon reading the following description, given solely by way of non-limiting example, and made with reference to the annexed drawings, in which.

DETAILED DESCRIPTION OF EXEMPLARY EMBODIMENTS

Figure 1:
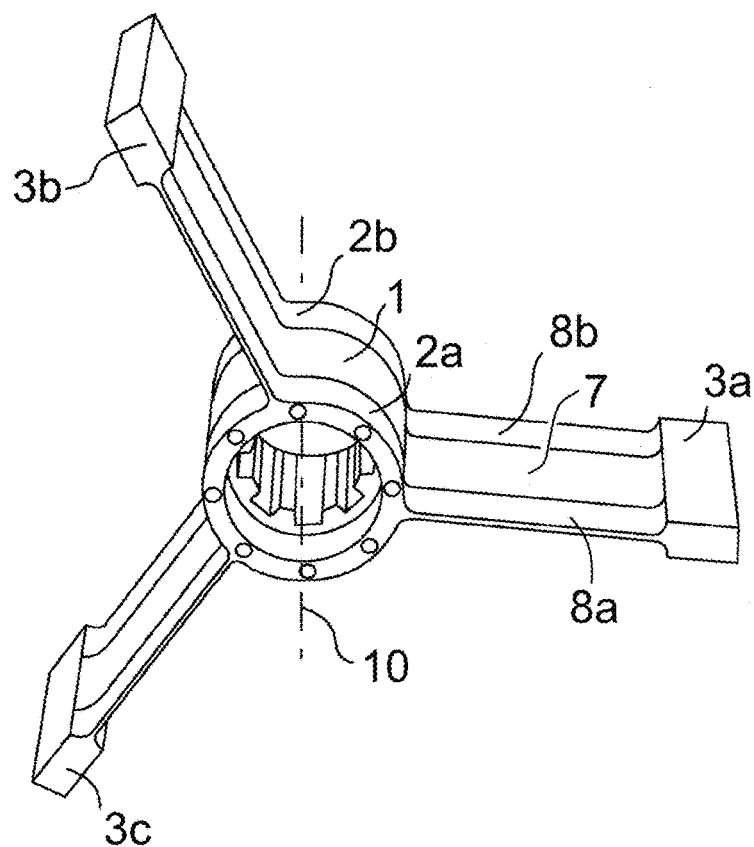
FIG. 1 is a perspective view of a prior art two-stage flexible pivot.
Figure 2:
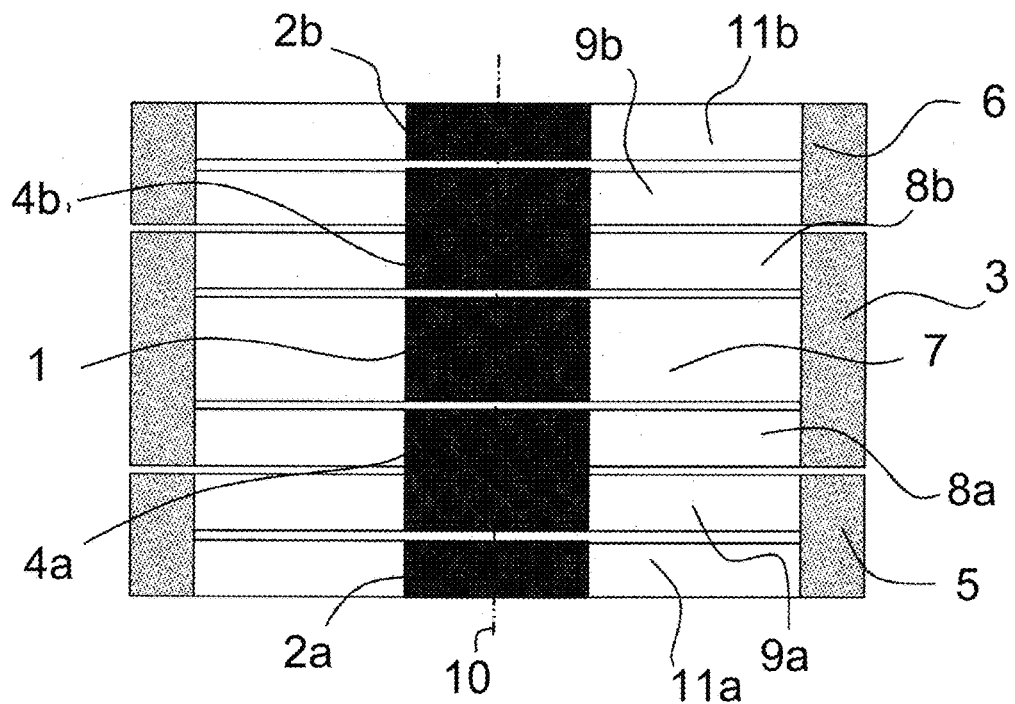
FIG. 2 is a cross-sectional view of prior art four-stage flexible pivot.
Figure 3A:
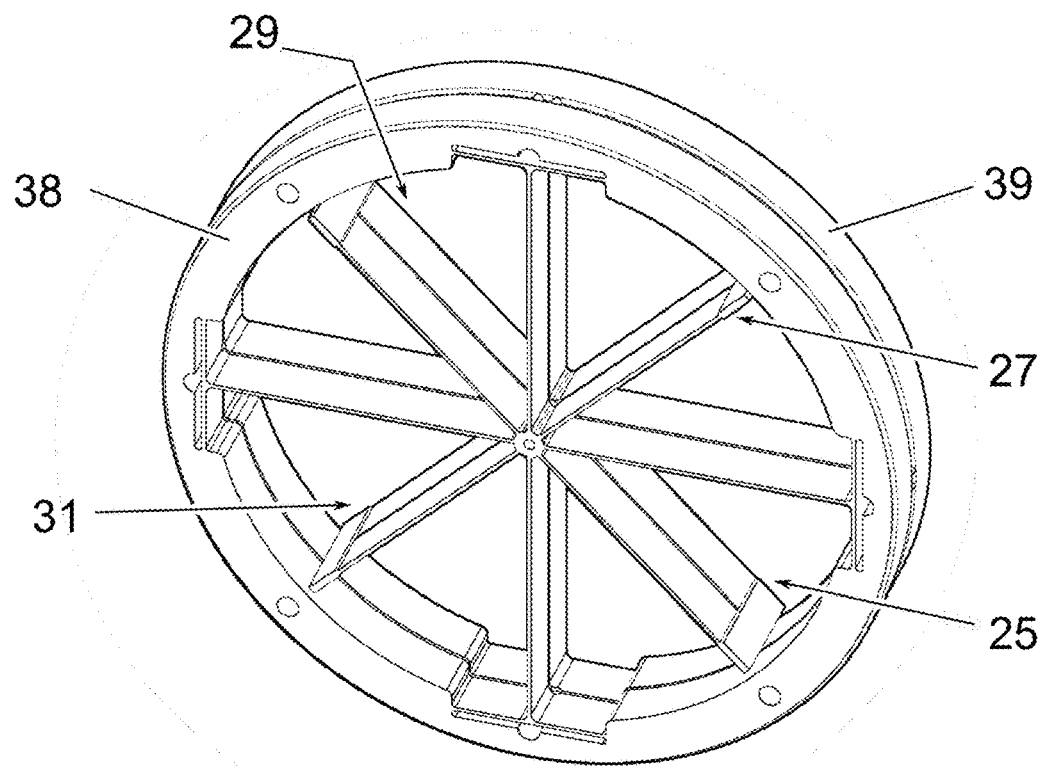
FIG. 3A is perspective view of flexible pivot corresponding to a particular variant of a first exemplary embodiment of the invention.
Figure 4A:
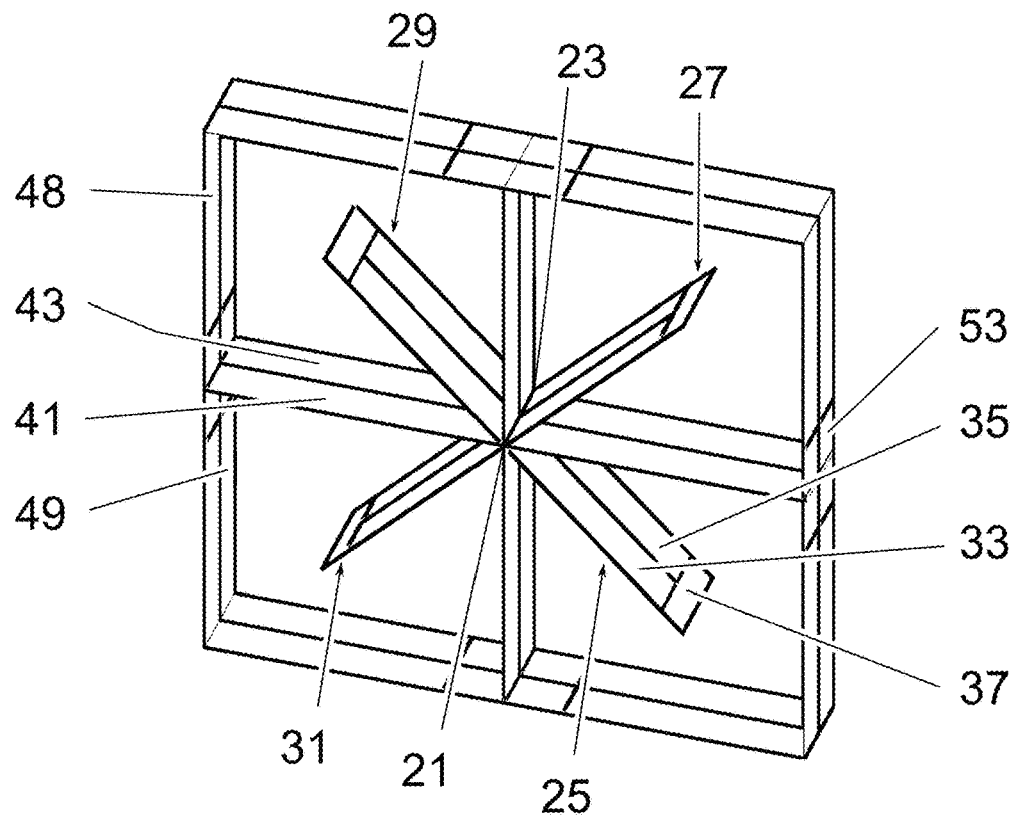
FIG. 4A is a schematic view of a flexible pivot corresponding to a second variant of the first exemplary embodiment of the invention.

FIGS. 3A and 4A show two flexible pivots that correspond respectively to two particular variants of a first exemplary embodiment of the invention. The flexible pivots of the invention are preferably formed as an integral structure made from a single piece of material. For example, the material could be titanium or steel and the flexible pivot could be made out of a piece of metal by electro-erosion. The center of both the illustrated flexible pivots is formed by two hub portions in axial alignment with each other. Although the hub portions illustrated in FIG. 4A are not exactly cylindrical, all hub portions will be called cylinders in the following discussion. FIGS. 3A and 4A therefore both show a first cylinder 21, a second cylinder 23, and four flexible connecting members (referenced 25, 27, 29 and 31 respectively) for connecting the two cylinders. According to the particular variants illustrated in FIGS. 3A and 4A, the four flexible connecting members are regularly spaced around the cylinders, both illustrated flexible pivots accordingly exhibiting a 4-fold rotational symmetry. One will understand however that the flexible pivot could exhibit a different rotational symmetry. For example, any n-fold rotational symmetry, where "n" can be any integer equal or greater than 2. According to the invention, the flexible pivot could even exhibit no rotational symmetry at all. Furthermore, each connecting member comprises a pair of legs (33 and 35 respectively) and a cross member 37. It can be observed that the legs of the connecting members are arranged radially around the axis of the flexible pivot along a plane that is perpendicular to said axis, and that the cross member is attached to one end of each leg in such a way as to give the flexible connecting member the general shape of a U. It can further be observed that the other ends of the two legs of each U-shaped connecting member are attached to the first and the second cylinders respectively. It should be understood however that, according to other embodiments, instead of being U-shaped, the connecting members could be any shape considered to be adequate by a person skilled in the art. In particular, the flexible connecting members could be M-shaped like the prior art connecting members shown in FIG. 1. Furthermore, according to still other embodiments, instead of extending along a radial direction, each leg could extend along a direction contained in a plane perpendicular to the axis of the pivot, but slightly inclined relatively to a radial direction.

Both illustrated pivots further comprise a first interface structure and a second interface structure. In FIG. 3A, the first and second interface structures shown are cylindrical and are referenced 38 and 39 respectively. In contrast, the first and second interface structures of the flexible pivot depicted in FIG. 4A are in the shape of two square frames referenced 48 and 49 respectively. According to the invention, the flexible pivot is designed to be fixed to a base (not shown) by one of the interface structures and to carry a load (not shown) attached to the other interface structure. Also according to the invention, the first and the second interface structures are connected via flexible connection means to the first and the second cylinders respectively. Furthermore, the flexible connection means connecting the first interface structure and the first cylinder consist in a (first) set of flexible spokes 41 attached to the first cylinder 21 by one end and to the first interface structure 38 by the other end.

Still referring to FIGS. 3A and 4A, it can be seen that, in the illustrated pivots, the first and second interface structures are concentric with the first and second cylinders respectively, with the first and second interface structures surrounding the first and second cylinders. It can further be seen that the flexible connection means that connects the second interface structure with the second cylinder consists in a second set of flexible spokes 43. Furthermore, the spokes 41 joining the first interface structure with the first cylinder, and the spokes 43 joining the second interface structure with the second cylinder, are each shaped like a T-bar, each T-bar 41 or 43 being made up of an elongated stem, one end of which carries a thin strip 53 forming the crossbar of the T. It can be observed that, according to the present embodiment, all the T-bars or spokes 41, 43 are arranged with their stem extending radially around the axis of the flexible pivot along a plane that is perpendicular to said axis. It should be noted however, that according to other embodiments (not shown), instead of extending along a radial direction, each T-bar could extend along a direction contained in a plane perpendicular to the axis of the pivot, but slightly inclined relatively to a radial direction.

Still referring to FIGS. 3A and 4A, it can further be observed that the T-bars are each oriented with its crossbar at the outer end. Accordingly, the four flexible T-bars forming the first set of spokes 41 have their inner end attached to the first cylinder 21 and have the thin strip 53 forming their outer end attached to the first interface structure 38 or 48. In a similar fashion, the four flexible T-bars forming the second set of spokes 43 have their inner end attached to the second cylinder 23 and have the thin strip 53 forming their outer end attached to the second interface structure 39 or 49. It should be understood however, that according to alternative embodiments of the invention, instead of surrounding the first and second cylinders, the first and second interface structures could be arranged concentrically inside the first and second cylinders, in such a way that it would be the first and second cylinders that would surround the first and second interface structures respectively. The person skilled in the art will understand that, in the case of such a configuration, each T-bar would have its inner end attached to the first or the second interface structure, and would have the thin strip 53 forming its outer end attached to the first or second cylinder.

Figure 3B:
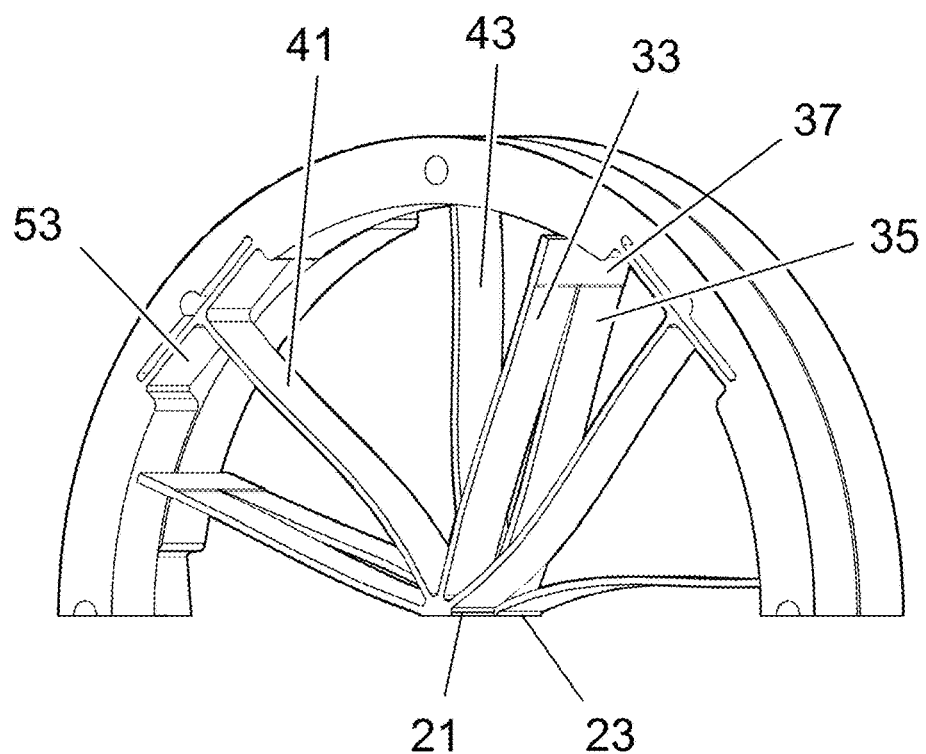
FIG. 3B is partial perspective view of the flexible pivot of FIG. 3A having undergone a 45° rotation, and showing in particular the joint between a spoke and the interface structure.

FIG. 3B is partial plane view of the flexible pivot of FIG. 3A having undergone a 45° rotation. Comparing FIGS. 3A and 3B, it can be noted that, as shown in FIG. 3B, rotation of the first and second interface structures 38, 39, relatively to each other, has caused both the legs 33, 35 of each of the flexible connecting members 25, 27, 29, 31, as well as the stems of the spokes 41, 43 forming the flexible connection means, to bend substantially. One will understand that the flexibility of the spokes 41, 43 as well as of the legs 33, 35 of the flexible connecting members contributes to the rotational range of the pivot.

According to the embodiment of the invention illustrated in FIGS. 3A, 3B and 4A, the flexible pivot comprises both first and second flexible attachment means for allowing the effective length of the spokes in the first and the second set of spokes to vary in such a way as to accommodate for any change in the curvature of the spokes. In particular, referring now more particularly to FIG. 3A and 3B, it can be seen that the thin strips 53 forming the outer end of each of the T-bar-shaped spokes in the first set of spokes 41 are integrally attached to the first interface structure 38 at either end. The strips 53 are thin enough so they can deform elastically, making it possible for the point of attachment of the stem with the thin strip of each T-bar to move slightly in a radial direction relative to the axis of the flexible pivot. The elasticity of the thin strips also allows the orientation of the neutral plane of each one of them, at the point of attachment with the stem of the "T", to tilt slightly in such a way as to accommodate for the curvature of the stem during rotation of the complete pivot. It can further be seen that the thin strips 53 forming the outer end of each of the T-bar-shaped spokes in the second set of spokes 43 are integrally attached to the second interface structure 39 at either end. It should therefore be understood that, according to the presently described embodiment, the first flexible attachment means comprise the thin strips 53 of the T-bar-shaped spokes 41 in the first set of spokes, and that the second flexible attachment means comprise the thin strips 53 of the T-bar-shaped spokes 43 in the second set of spokes.

Figure 4B:
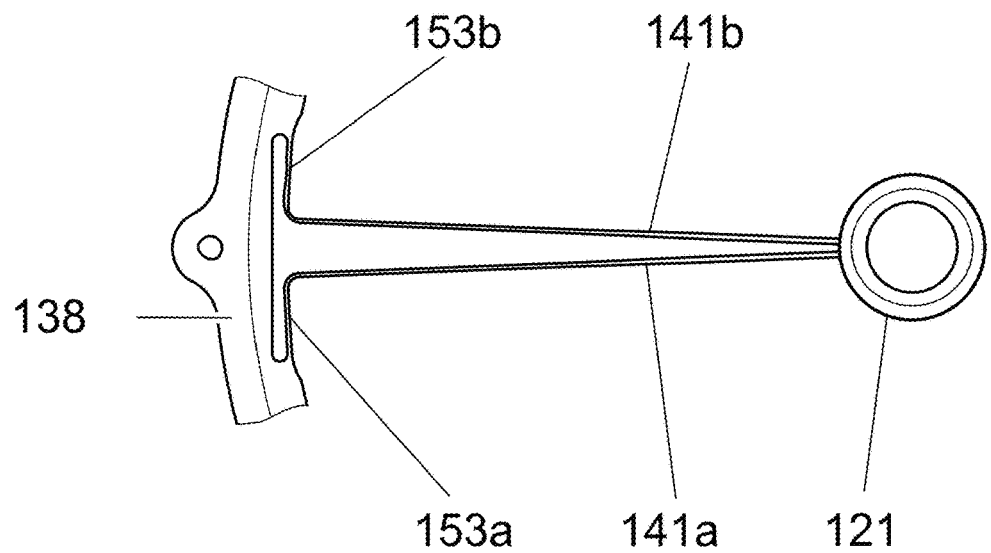
FIG. 4B is a partial plane view of a flexible pivot corresponding to a third variant of the first embodiment of the invention.

One will understand that the T-bar structure that has just been described corresponds to one of several possible implementations of the flexible attachment means arranged for allowing the effective length of the spokes to vary in such a way as to accommodate for an increase in the curvature of the spokes when the flexible pivot is turned from its rest position. For example, according to alternative variants, instead of consisting in T-bar-shaped spokes, the flexible connection means for connecting the first and second interfaces to the first and second cylinders could consist in two sets of L-bars. Referring now to FIG. 4B, it can be seen that the connection means connecting the first interface structure and the first cylinder consist in a first set of flexible spokes 141a, 141b attached to the first cylinder 121 by one end and to the first interface structure 138 by the other end. Furthermore, each spoke in the first set of spokes is shaped like a L-bar, each L-bar being made up of an elongated stem, one end of which carries a thin strip 153a or 153b forming the base of the L. It can further be observed that, according to the variant of FIG. 4B, half the L-bars 141a are right-facing and the other half 141b are left-facing, each right-facing L-bar being paired with a left-facing L-bar, in such a way as to form four pairs of L-bar-shaped spokes. It can further be seen that the first and second spoke in each pair of spokes 141a, 141 b are positioned symmetrically, back to back. Finally, it can be noted that the four pairs of spokes are arranged radially around the axis of the flexible pivot along a plane that is perpendicular to said axis. Or, to express things more precisely, each pair of L-bars 141a, 141b is arranged with the plan of symmetry of the pair oriented radially around the axis of the flexible pivot, the stem of each L-bar actually extending along a direction contained in a plane perpendicular to the axis of the pivot, but slightly inclined relatively to a radial direction.

Still referring to FIG. 4B, it can further be observed that each one of the L-bars is oriented with its base at the outer end. Accordingly, the eight flexible L-bars 141a or 141b forming the first set of spokes have their inner end attached to the first cylinder 121 and have the thin strip 153a or 153b forming their outer end attached to the first interface structure 138. As already explained in relation to FIGS. 3A, 3B and 4A, according to alternative embodiments of the invention (not shown), instead of surrounding the first and second cylinders, the first and second interface structures could be arranged concentrically inside the first and second cylinders, in such a way that it would be the first and second cylinders that would surround the first and second interface structures respectively. The person skilled in the art will understand that, in the case of such a configuration, each L-bar would have its inner end attached to the first or the second interface structure, and would have the thin strip 153a or 153b forming its outer end attached to the first or second cylinder.

As was already the case with the embodiments of the invention illustrated in FIGS. 3A, 3B and 4A, the flexible pivot illustrated in FIG. 4B comprises flexible attachment means for allowing the effective length of the spokes to vary in such a way as to accommodate for any change in the curvature of the spokes. In particular, FIG. 4B shows that the thin strips 153a and 153b forming the outer end of each of the L-bar-shaped spokes 141a and 141b are integrally attached to the first interface structure 138 by their distal end. The thin strips 153a, 153b are thin enough so they can deform elastically, making it possible for the point of attachment of the stem with the thin strip of each L-bar to move slightly in a radial direction relative to the axis of the flexible pivot. The elasticity of the thin strips also allows the orientation of the neutral plane of each one of them, at the point of attachment with the stem of the "L", to tilt slightly in such a way as to accommodate for the curvature of the stem during rotation of the complete pivot.

Figure 5:
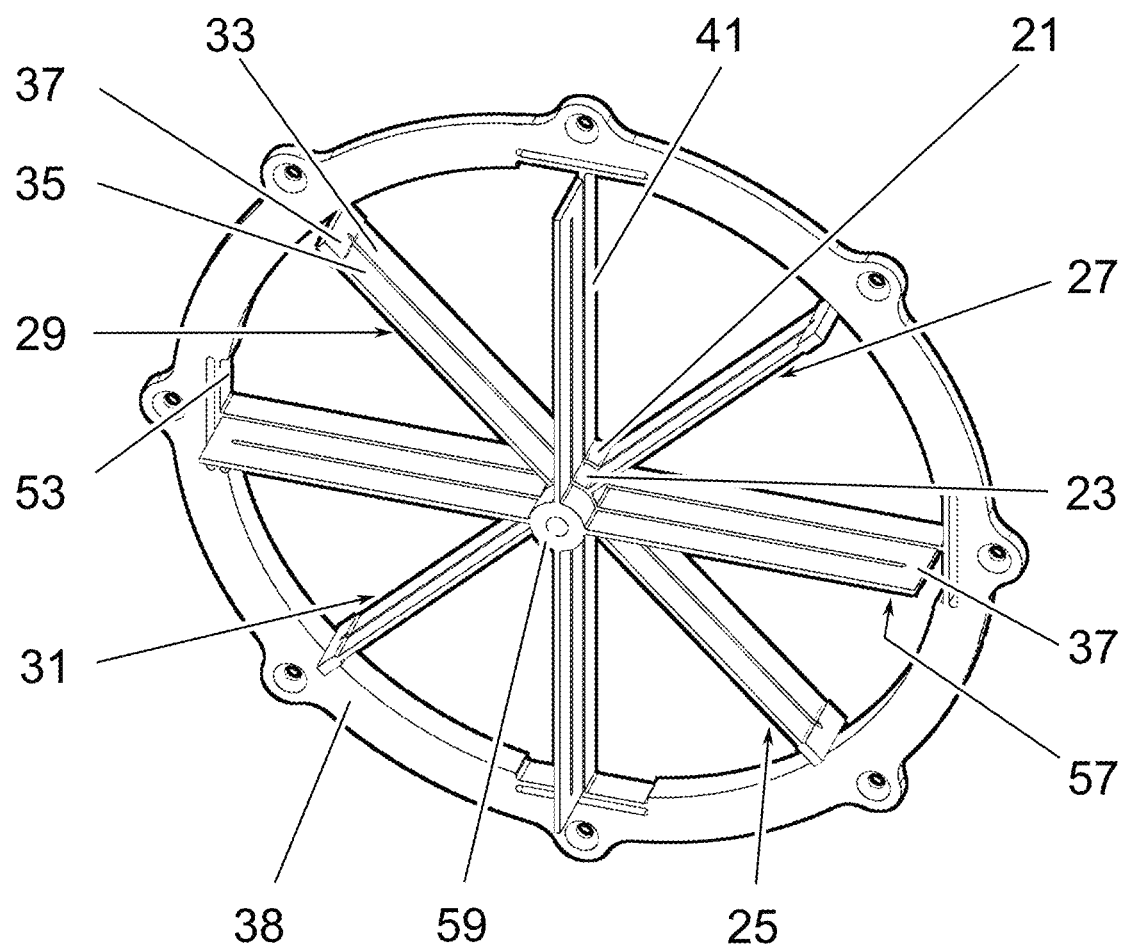
FIGS. 5 and 6 are two views (perspective and cross-sectional respectively) of a second exemplary embodiment of the invention.
Figure 6:
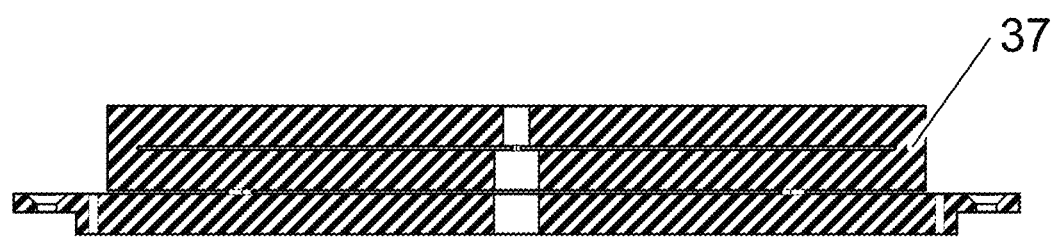

FIGS. 5 and 6 are two views (a perspective view and a cross-sectional view) of a second exemplary embodiment of the invention. As can be observed, the flexible pivot depicted in FIGS. 5 and 6 has a lot in common with the flexible pivots depicted in FIGS. 3A, 3B and 4A. Accordingly, the elements of the flexible pivot of FIGS. 5 and 6 that are identical or very similar to elements of the previous figures are designated by the same reference numbers. As was the case with the first embodiment, the flexible pivot according to the second embodiment comprises both a first interface structure and a second interface structure. The first interface structure 38 is very similar to that of the first exemplary embodiment. However, according to the second embodiment, the second interface structure (referenced 59 is implemented in the form of a hub that is axially aligned with the first 21 and the second 23 cylinders.

According to the invention, the flexible pivot comprises flexible connection means arranged to connect the second cylinder 23 and the second interface structure 59. Referring again to FIGS. 5 and 6, it can be seen that according to the illustrated example the flexible connection means are implemented in the form of a second set of flexible connecting members 57. In a similar fashion to what is the case with the first set of flexible connecting members 25, 27, 29 and 31, each flexible connecting member 57 comprises a pair of legs and a cross member joining one of the ends of each leg. As further shown in FIG. 5, the legs of the connecting members 57 are arranged radially around the axis of the flexible pivot along a plane that is perpendicular to said axis. Furthermore, the other ends of the two legs of each connecting member 57 are attached to the second cylinder and to the second interface structure 59 respectively. It can also be noted that the legs of the second connecting members that are attached to the second cylinder are intercalated between the corresponding legs of the first connecting members 25, 27, 29 and 31. The person skilled on the art will understand that the flexible pivot that has just been described has 40% more angular capacity than an equivalent flexible pivot according to the first embodiment. This increase comes at a price however, since the axial length of the flexible pivot is increased by 50%.

Figure 7:
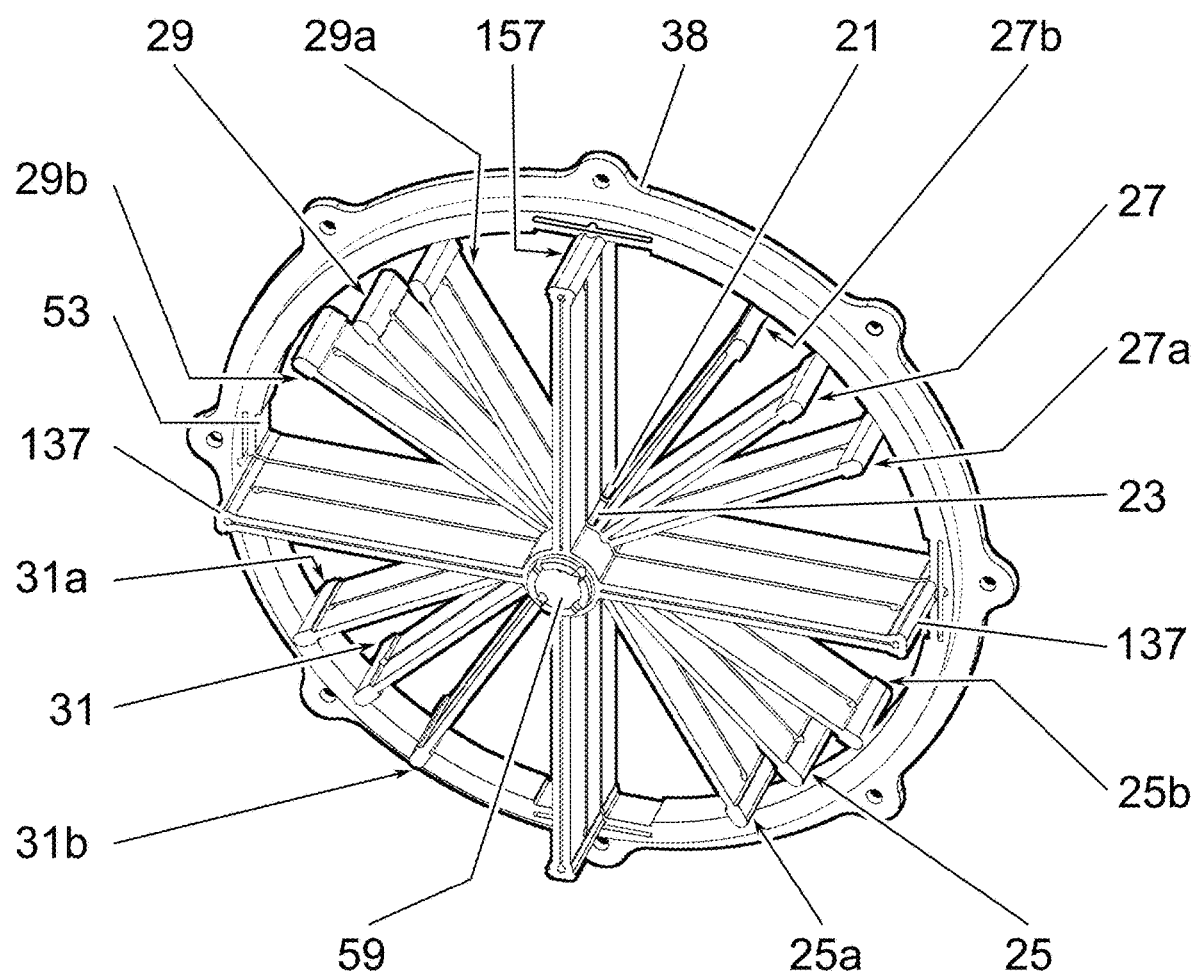
FIGS. 7 and 8 are two views (perspective and cross-sectional respectively) of a third exemplary embodiment of the invention.
Figure 8:
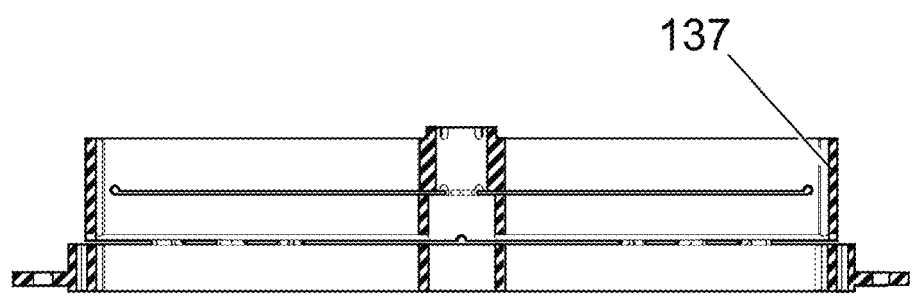

FIGS. 7, 8, 9 and 10 show a third and a fourth embodiment of the flexible pivot according to the invention. Referring first to FIG. 7, it can be seen that according to the third exemplary embodiment, the first set of flexible connecting members comprises twelve connecting members (25, 25a, 25b, 27, 27a, 27b, 29, 29a, 29b, 31, 31a and 31b respectively) instead of four. A second difference between the second and third exemplary embodiment is that, according to the third embodiment, the flexible connecting members 157 in the second set of flexible connecting members each comprise two pairs of legs, one leg of each pair being attached to the second cylinder 23 and the other leg of each pair being attached to the second interface structure 59, and the legs of both pairs being joined by a cross member (referenced 137 in FIGS. 7, 8 and 10).

Figure 9:
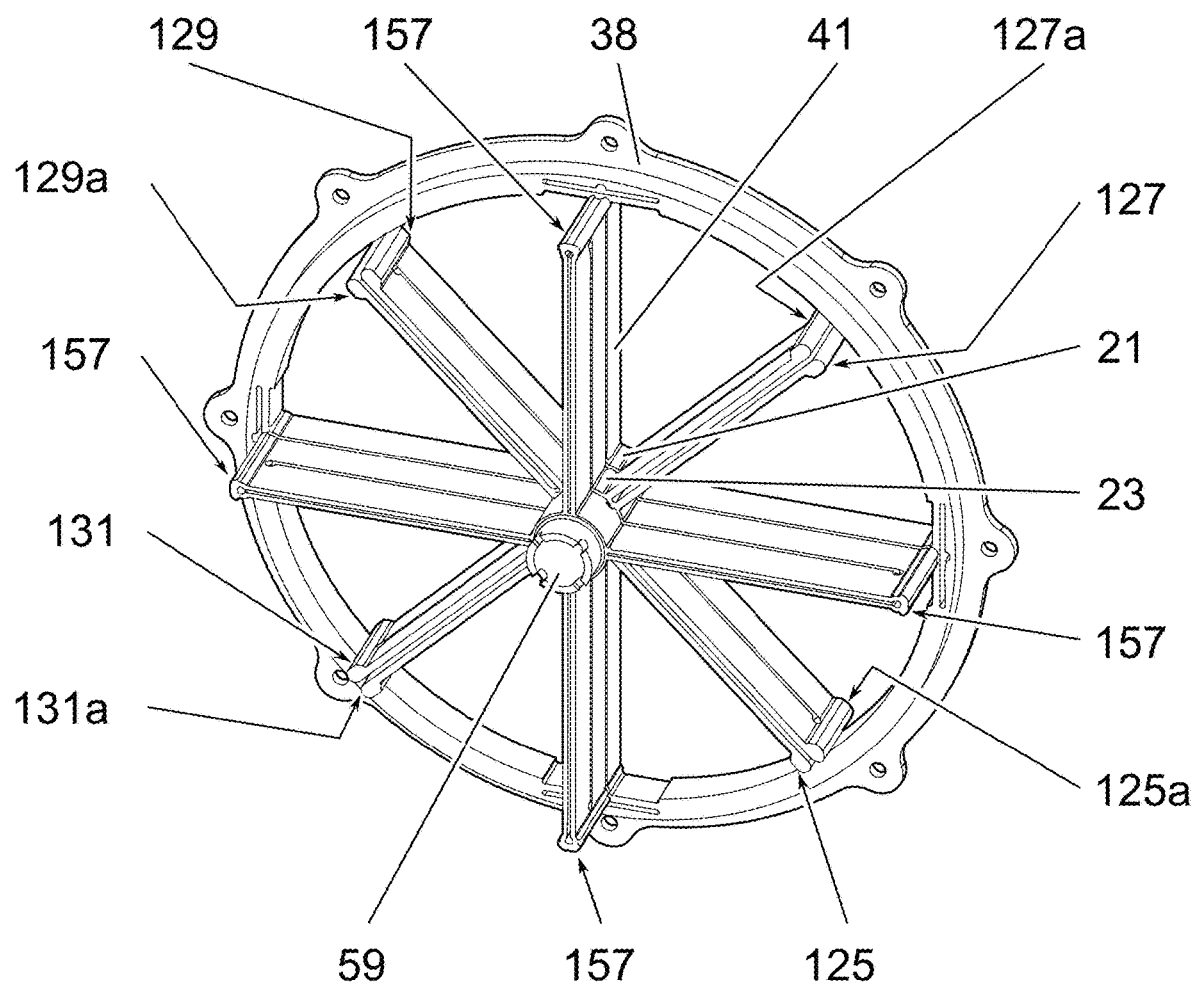
FIGS. 9 and 10 are two views (perspective and cross-sectional respectively) of a fourth exemplary embodiment of the invention.
Figure 10:
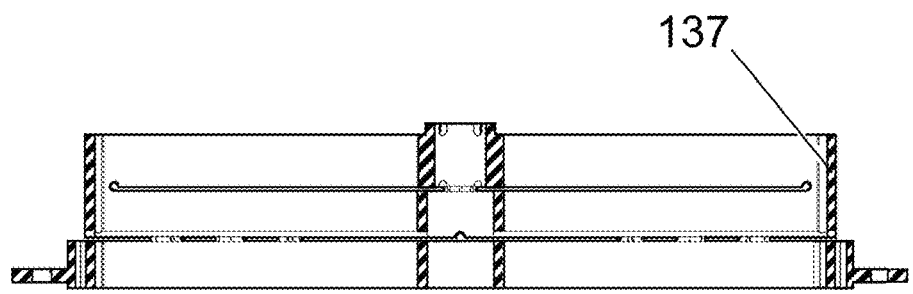

Referring now to FIGS. 9 and 10, it can be seen that according to the fourth exemplary embodiment, the first set of flexible connecting members comprises eight connecting members (125, 125a, 127, 127a, 129, 129a, 131 and 131a respectively) instead of four or twelve. As is more clearly shown in FIG. 9, the flexible connecting members of the first set of flexible connecting members are grouped two by two.

It will be understood that various changes and/or improvements evident to those skilled in the art could be made to the embodiments that form the subject of this description without departing from the scope of the present invention defined by the annexed claims. In particular, any embodiment of the flexible pivot of the invention can be equipped with flexible attachment means in the form of T-bars, L-bars or any other form that will seem appropriate to the person skilled in the art. Conversely, one could dispense with including flexible attachment means even in the first embodiment. In this case, the spokes in the set of flexible spokes, would not be shaped either like T-bars or like L-bars, but would preferably be shaped like simple blades or bars.

The invention claimed is:

1. A flexible pivot comprising:
a first stage comprising a first ring-shaped interface structure;
a second stage comprising a second ring-shaped interface structure in axial alignment with the first interface structure,
the flexible pivot being configured to be fixed to a base by one of the first and second interface structures and to carry a load attached to the other one of the first and second interface structures;
a first cylinder forming part of the first stage;
a second cylinder forming part of the second stage and being in axial alignment with the first cylinder and concentric with the second interface structure; and
a set of flexible connecting members configured to connect the first and the second stages, each of the flexible connecting members comprising:
a pair of legs, each of the legs extending in a direction transverse to a longitudinal axis of the respective first and second cylinders, the legs being attached to the first and second cylinders respectively, and
a cross member joining distal ends of each of the legs and being radially disposed between the first and second cylinders and inner surfaces of the first and second interface structures,
wherein the first cylinder and the first interface structure are concentric, the first stage comprising a set of flexible spokes, each of the spokes being attached to the first cylinder by an inner end and to the first interface structure by an outer end, each of the spokes extending in a direction transverse to the longitudinal axis of the first cylinder, the spokes being intercalated between the legs of the flexible connecting members that are attached to the first cylinder,
wherein the outer end of each spoke in the set of spokes forms a strip integrally connected to the first interface structure, the strip being elastically deformable and allowing an effective length of the spokes to vary to allow for flexing of the strip in order to provide relative movement between the outer end of the spoke and the inner surface of the first interface structure to accommodate any change in a curvature to the spokes, and
wherein the second stage comprises flexible connectors configured to connect the second cylinder and the second interface structure.

2. The flexible pivot according to claim 1, wherein the strip is oriented at an angle relative to the rest of the spoke.

3. The flexible pivot according to claim 2, wherein each spoke in the set of spokes is in the form of an L-bar, the base of the L being formed by the strip.

4. The flexible pivot according to claim 3, wherein said set of flexible spokes is a first set of flexible spokes, and
wherein the flexible connectors comprise a second set of flexible spokes attached to the second cylinder by an inner end and to the second interface structure by an outer end, each spoke in the second set of flexible spokes extending in a direction transverse to the longitudinal axis of the second cylinder.

5. The flexible pivot according to claim 2, wherein each spoke in the set of spokes is in the form of a T-bar, the crossbar of the T being formed by the strip, and
wherein distal ends of the strip are integrally connected to the first interface structure to allow a point of attachment of the strip to the rest of the spoke to move in a radial direction relative to the longitudinal axis of the first cylinder.

6. The flexible pivot according to claim 5, wherein said set of flexible spokes is a first set of flexible spokes, and
wherein the flexible connectors comprise a second set of flexible spokes attached to the second cylinder by an inner end and to the second interface structure by the other an outer end, each spoke in the second set of flexible spokes extending in a direction transverse to the longitudinal axis of the second cylinder.

7. The flexible pivot according to claim 2, wherein said set of flexible spokes is a first set of flexible spokes, and
wherein the flexible connectors comprise a second set of flexible spokes attached to the second cylinder by an inner end and to the second interface structure by an outer end, each spoke in the second set of flexible spokes extending in a direction transverse to the longitudinal axis of the second cylinder.

8. The flexible pivot according to claim 1, wherein said set of flexible spokes is a first set of flexible spokes, and
wherein the flexible connectors comprise a second set of flexible spokes attached to the second cylinder by an inner end and to the second interface structure by an outer end, each spoke in the second set of flexible spokes extending in a direction transverse to the longitudinal axis of the second cylinder.

9. The flexible pivot according to claim 8, wherein the spokes in the second set of flexible spokes are intercalated between the legs of the flexible connecting members that are attached to the second cylinder.

10. The flexible pivot according to claim 8, wherein the outer end of each spoke in the second set of spokes is more distant from the second cylinder than the inner end, and
wherein the second stage comprises flexible attachment devices configured to attach the outer end of each of said flexible spokes in the second set to the second interface structure.

11. The flexible pivot according to claim 10, wherein the flexible attachment devices comprise a strip that is oriented at an angle relative to the rest of the spoke, at least a distal end of the strip being integrally connected to the second interface structure, the strip being elastically deformable to allow the flexible pivot to accommodate to any change in a curvature of the spokes.

12. The flexible pivot according to claim 11, wherein each spoke in the second set of spokes is in the form of an L-bar, the base of the L being formed by the strip, the distal end of the strip being integrally connected to the second interface structure.

13. The flexible pivot according to claim 11, wherein each spoke in the second set of spokes is in the form of a T-bar, the crossbar of the T being formed by the strip, and
wherein both distal ends of the strip are integrally connected to the second interface structure to allow a point of attachment of the thin strip to the rest of the spoke to move in a radial direction relative to the longitudinal axis of the first cylinder.

14. The flexible pivot according to claim 1,
wherein the set of flexible connecting members is a first set of flexible connecting members, and
wherein the flexible connectors comprise a second set of flexible connecting members, each flexible connecting member in the second set of flexible connecting members comprising a pair of legs and a cross member joining the legs, each of the legs extending in a direction transverse to the longitudinal axis of the first cylinder, the legs of each flexible connecting member in the second set of flexible connecting members being respectively attached to the second cylinder and the second interface structure.

15. The flexible pivot according to claim 14, wherein legs of the flexible connecting members in the second set of flexible connecting members that are attached to the second cylinder are intercalated between the legs of the flexible connecting members in the first set of flexible connecting members that are also attached to the second cylinder.

16. The flexible pivot according to claim 14, wherein each flexible connecting member in the second set of flexible connecting members comprises two pairs of legs, one leg of each pair of legs being attached to the second cylinder and the other leg of each pair being attached to the second interface structure, and the legs of both pairs being joined by the cross member.

17. The flexible pivot according to claim 1, wherein the flexible pivot has n-fold rotational symmetry, n being an integer equal or greater than 2, the number of flexible connecting members being equal to n or being an integer multiple of n.

* * * * *